US011923574B2

United States Patent
Shimizu et al.

(10) Patent No.: US 11,923,574 B2
(45) Date of Patent: Mar. 5, 2024

(54) FUEL CELL POWERTRAIN WITH INTEGRATED AIR FILTER

(71) Applicant: TOYOTA MOTOR ENGINEERING & MANUFACTURING NORTH AMERICA, INC., Plano, TX (US)

(72) Inventors: Hayato Shimizu, Plano, TX (US); Craig Vargo, Plano, TX (US); Mauricio Martinez, II, Canton, MI (US)

(73) Assignee: TOYOTA MOTOR ENGINEERING & MANUFACTURING NORTH AMERICA, INC.

( * ) Notice: Subject to any disclaimer, the term of this patent is extended or adjusted under 35 U.S.C. 154(b) by 499 days.

(21) Appl. No.: 17/307,960

(22) Filed: May 4, 2021

(65) Prior Publication Data

US 2022/0359890 A1   Nov. 10, 2022

(51) Int. Cl.
*B60K 13/02* (2006.01)
*H01M 8/0276* (2016.01)
*H01M 8/04082* (2016.01)
*H01M 8/04089* (2016.01)

(52) U.S. Cl.
CPC ......... *H01M 8/04089* (2013.01); *B60K 13/02* (2013.01); *H01M 8/0276* (2013.01); *H01M 8/04201* (2013.01); *H01M 2250/20* (2013.01)

(58) Field of Classification Search
CPC ........... H01M 8/04089; H01M 8/0276; H01M 8/04201; H01M 2250/20; B60K 13/02
See application file for complete search history.

(56) References Cited

U.S. PATENT DOCUMENTS 9,466,849 B2 * 10/2016 Ikeya ..................... B60L 58/33
9,705,140 B2 *  7/2017 Matsumoto ....... H01M 8/04753

FOREIGN PATENT DOCUMENTS

| DE | 102017204715 A1 | 9/2018 | |
| JP | 2017174565 A * | 9/2017 | |
| WO | WO-2020018832 A1 * | 1/2020 | ........ H01M 8/04014 |

OTHER PUBLICATIONS

Mechanical translation of JP2017174565, Sep. 2017.*

* cited by examiner

Primary Examiner — John D Walters
(74) Attorney, Agent, or Firm — SHEPPARD, MULLIN, RICHTER & HAMPTON LLP; Hector A. Agdeppa; Daniel N. Yannuzzi

(57) ABSTRACT

Systems and methods are provided for an integrated air filter assembly for a multiple fuel cell powertrain. The integrated air filter assembly can include a common inlet to pull air from a single plenum of the hood, where the intake path can be split into multiple ducts providing air flow into each respective fuel cell. Each duct can include a dedicated air filter to filter the incoming air. The assembly can also include flexible seal to adapt to the unique hood/plenum shape of different OEM plenums/intakes.

14 Claims, 4 Drawing Sheets

FUEL CELL POWERTRAIN WITH INTEGRATED AIR FILTER

TECHNICAL FIELD

The present disclosure relates generally to motor vehicles, and in particular, some implementations may relate to air intakes for fuel cell vehicles.

DESCRIPTION OF RELATED ART

Truck builders see hydrogen fuel cell Class 8 tractors as a viable successor to diesel power on long haul routes given ever tightening global environmental regulations. Fuel cell solutions can be implemented that leverage existing electric drive technology that has already been developed for battery-electric trucks. However, unlike conventional battery based power trains, fuel cells have the advantage of quick refueling stops similar to a diesel tractor.

Toyota, for example, unveiled its first fuel cell tractor in 2017 using a system based on the previous generation sedan, the Toyota Mirai. This particular Toyota fuel system uses a smaller hydrogen storage cabinet behind the cab, which includes six hydrogen tanks.

In order to meet the demands of heavy loads, various heavy duty tractors and even some smaller vehicles are provided with multiple fuel cells. However, multiple fuel cells generally means more complexity.

BRIEF SUMMARY OF THE DISCLOSURE

According to various embodiments of the disclosed technology an air intake assembly for a multi-fuel-cell vehicle, may include: an intake plenum comprising an intake opening and an outlet opening; a flexible seal disposed around the intake opening of the intake plenum; a plurality of air boxes; and a plurality of air ducts each disposed with an intake coupled to receive air from the intake plenum and to channel the air into its respective air box; wherein the quantity of air boxes and air ducts corresponds to a quantity of fuel cells in the multi-fuel cell vehicle.

The intake assembly may further include a plurality of output ducts disposed to couple air from their respective air boxes to their respective fuel cells. The intake assembly may further include a plurality of air filters disposed within their respective air boxes. The intake plenum may include a rigid material and the flexible seal is sufficiently flexible to mate with an OEM plenum of the multi-fuel-cell vehicle.

A multi-fuel-cell vehicle, may include: an air intake assembly for a multi-fuel-cell vehicle. The air intake assembly may include: an intake plenum comprising an intake opening and an outlet opening; a flexible seal disposed around the intake opening of the intake plenum; a plurality of air boxes; a plurality of air ducts each disposed with an intake coupled to receive air from the intake plenum and to channel the air into its respective air box; and wherein the quantity of air boxes and air ducts corresponds to a quantity of fuel cells in the multi-fuel cell vehicle.

The intake assembly may further include a plurality of output ducts disposed to couple air from their respective air boxes to their respective fuel cells. The intake assembly may further include a plurality of air filters disposed within their respective air boxes. The intake plenum may include a rigid material and the flexible seal is sufficiently flexible to mate with an OEM plenum of the multi-fuel-cell vehicle.

A method of manufacturing an air intake assembly for a multi-fuel-cell vehicle may include: providing a single intake plenum comprising an intake opening and an outlet opening; mounting a flexible seal around the intake opening of the single intake plenum; providing a plurality of air boxes; mounting a plurality of air ducts in a position with an intake coupled to receive air from the intake plenum and to channel the air into its respective air box; and wherein the quantity of air boxes and air ducts corresponds to a quantity of fuel cells in the multi-fuel cell vehicle.

The intake assembly may further include a plurality of output ducts disposed to couple air from their respective air boxes to their respective fuel cells. The intake assembly may further include a plurality of air filters disposed within their respective air boxes. The intake plenum may include a rigid material and the flexible seal is sufficiently flexible to mate with an OEM plenum of the multi-fuel-cell vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
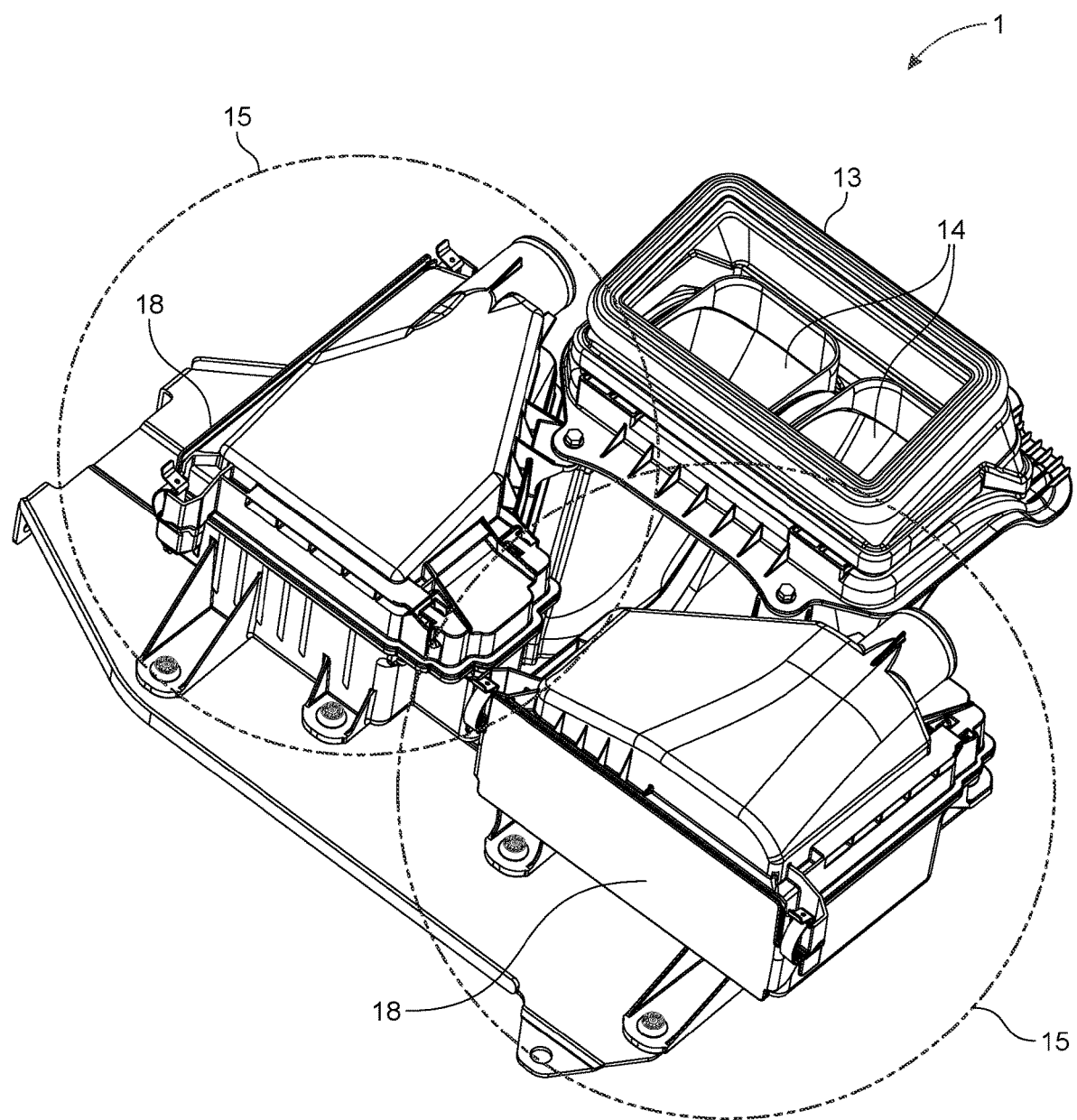
FIG. 1 illustrates an example air intake assembly for multiple fuel cell vehicles in accordance with various embodiments.

The figures are not exhaustive and do not limit the present disclosure to the precise form disclosed.

DETAILED DESCRIPTION

Embodiments of the systems and methods disclosed herein can provide for an air filter/cleaner system with two (or more) distinct air boxes that are configured to pull air from a single plenum under the hood of a vehicle. For example, the air intake in some embodiments is split into respective ducts providing air flow into each respective fuel cell. The air intake assembly in various embodiments disclosed herein directs air from a single supply plenum to multiple distinct air boxes (e.g. one air box for each fuel-cell). For example, in embodiments including two fuel cells, there may be two inlet ducts coupled to the single plenum and coupled to two air cleaners.

Although the orientation of air intake assembly is described in this document with the single intake plenum at the top of the assembly, one of ordinary skill in the art reading this description would understand that the air intake assembly can be mounted in other orientations including, for example, with the intake plenum at the side of the assembly. Accordingly, the use of terms such as "top," "bottom," "front," or "rear," are not intended to limit the spatial orientation of the assembly to a particular orientation, but are merely intended to facilitate description of the components in the example embodiments relative to one another.

Air filters may be provided in each box to filter out particulates or other contaminates from the incoming air. Stated another way, each airbox may have its own air filter, which may be, for example, a cartridge air filter or other type of air filter. In some embodiments, the cartridge may be the same as or similar to technology carried over from air filters for other vehicles. Accordingly, in some embodiments, the same or similar air filter components as used in other vehicles may be used in air boxes in accordance with the present disclosure.

Air from the single supply plenum may get split or diverted into two or more routes, one to each air box. From the air box, the air can be filtered through the filters (e.g., one filter for each airbox) and provided to the respective fuel cells.

Also, a flexible seal/interface is provided at the inlet side of the air boxes in order to adapt to different, unique hood/plenum shapes of multiple different OEM vehicles or to unique hood/plenum shapes of aftermarket components as well. A section at the top (or other appropriate location depending on the application) of each box is flexible so that it may be adapted for use with multiple different OEM or aftermarket configurations. This can be configured, for example, to allow the same air intake assembly to be used across multiple vehicle configurations, including across vehicles from multiple manufacturers. For example, the flexible interface can be configured to fit to the be surface of the particular OEM plenum. In various embodiments, the flexible interface/seal can be configured to be interchangeable such that different seals can be swapped in to provide compatibility with particular OEM or aftermarket hood/plenum configurations.

FIG. 1 illustrates an example air intake assembly for multiple fuel cell vehicles in accordance with various embodiments. This example includes an intake air source/plenum 13 two separate air ducts 14, two separate air boxes 15 and two separate air filters 18. As illustrated in this example, plenum 13 may be configured to provide a flexible interface to the unit. Separate air ducts 14 are provided to receive and channel inlet air from the single source at plenum 13 to the respective airboxes 15 for each respective fuel-cell. In this example, the vehicle may include two fuel cells and there are two air boxes 15 and two ducts 14 to provide intake air to the respective fuel cells (not shown). In other embodiments, there may be other quantities of fuel cells in a multi-fuel-cell vehicle and the air intake assembly may be configured such that there is a separate air duct 14, airbox 15 and air filter 18 for each fuel-cell in the vehicle. Accordingly, there can be a one-to-one correspondence between components of the air intake assembly and the fuel cells of the vehicle.

Figure 2:
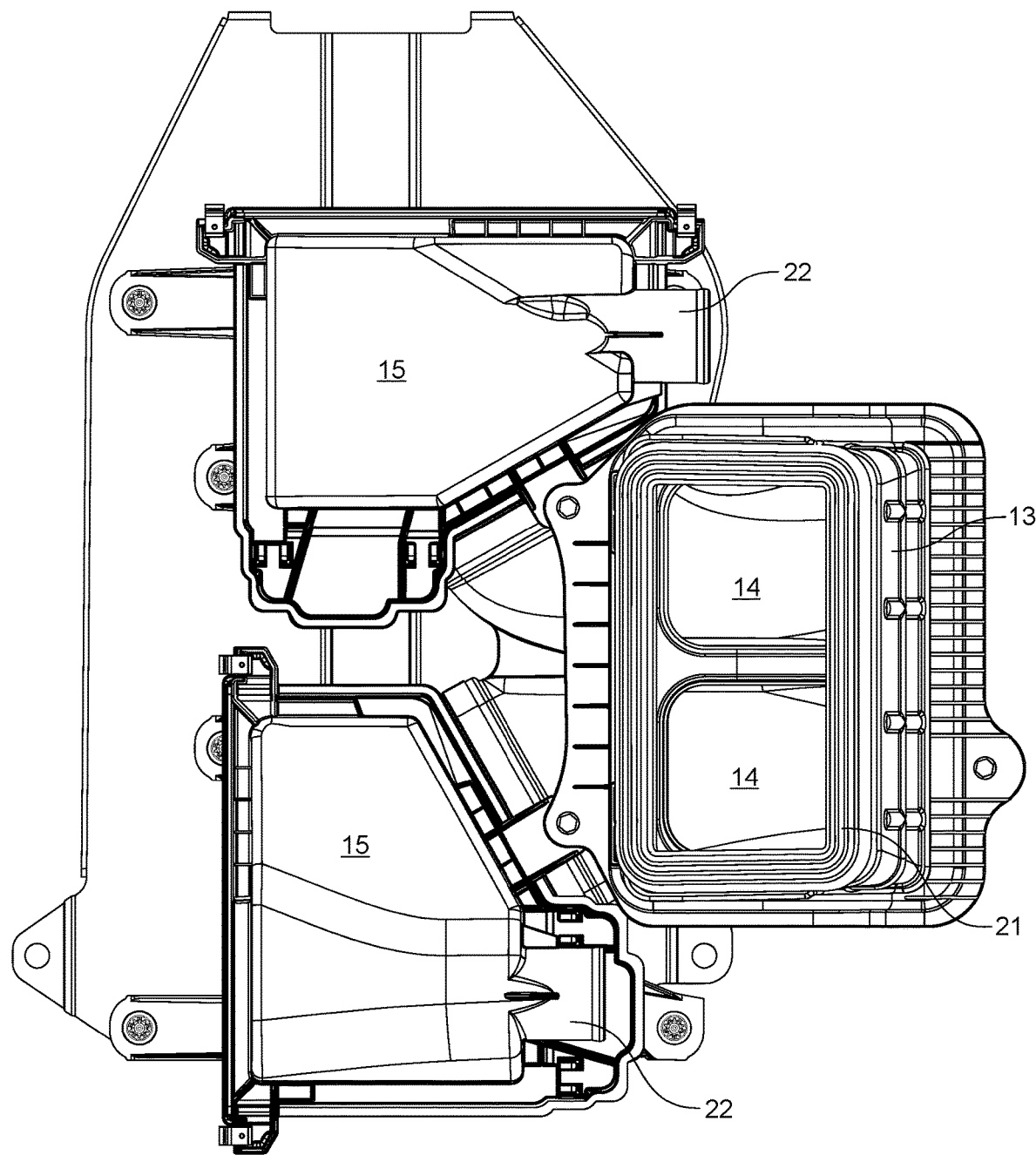
FIG. 2 illustrates a top-down view of the example air intake assembly of FIG. 1 in accordance with various embodiments.

FIG. 2 illustrates a top-down view of the example air intake assembly of FIG. 1 in accordance with various embodiments. As can be seen in this view, the inlet opening of air source 13 is defined by seal 21 which, in this example, is a rectangular shape with rounded corners. In alternative embodiments, the opening can be of any shape to accommodate the vehicle in which it is being installed. Seal 21 in various embodiments can be formed of a flexible membrane that can provide a relatively airtight seal between plenum 13 and the vehicle air intake components with which it mates. In some embodiments, seal 21 can be shaped to provide additional flexibility to allow mounting in different vehicles. For example, seal 21 may have accordion like pleats to allow flexibility in height. As seen from the top down view, air ducts 14 channel air from the intake opening to air boxes 15 where it can pass through the air filters 18. Outlet ducts 22 pass the filtered air to their respective fuel cells.

Figure 3:
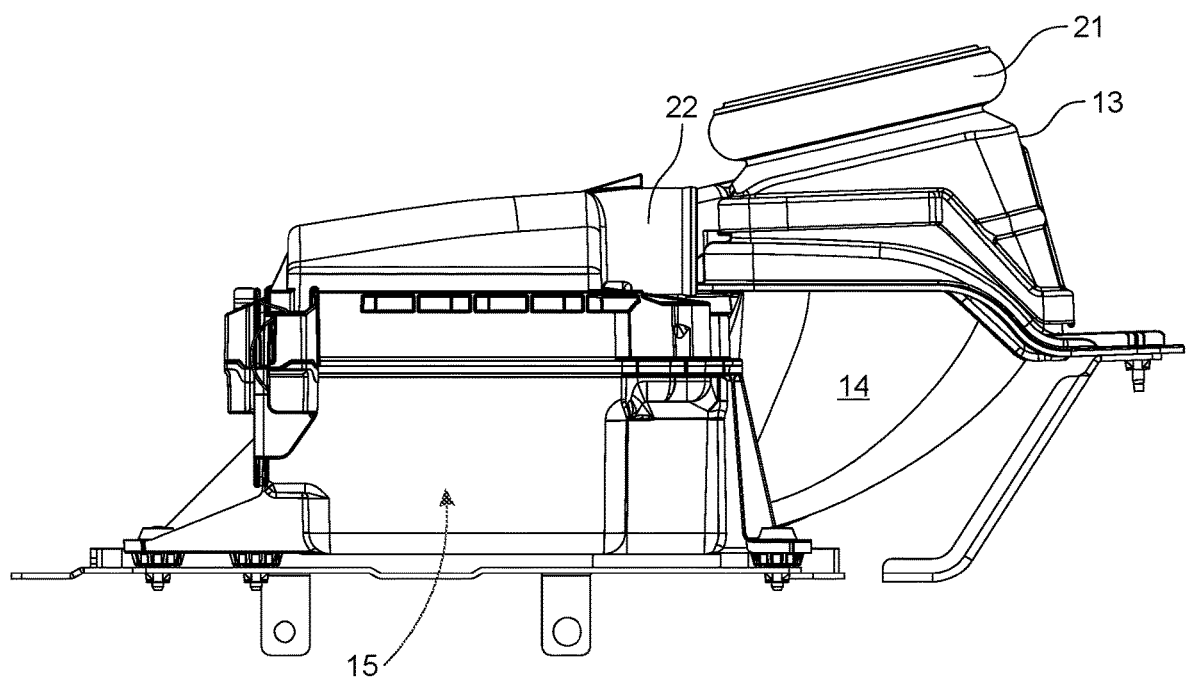
FIG. 3 illustrates a side view of the example air intake assembly of FIG. 1.

FIG. 3 illustrates a side view of the example air intake assembly of FIG. 1. As can be seen from this view, in this example embodiment seal 21 is a flexible membrane with a "C" shaped cross-section to allow flexibility. Seal 21 can be fabricated using silicone or other polymer materials or other elastomeric materials suitable for use in applications under the hood. Although in this example plenum 13 is made using relatively rigid materials, embodiments may also be implemented in which plenum 13 is flexible.

Figure 4:
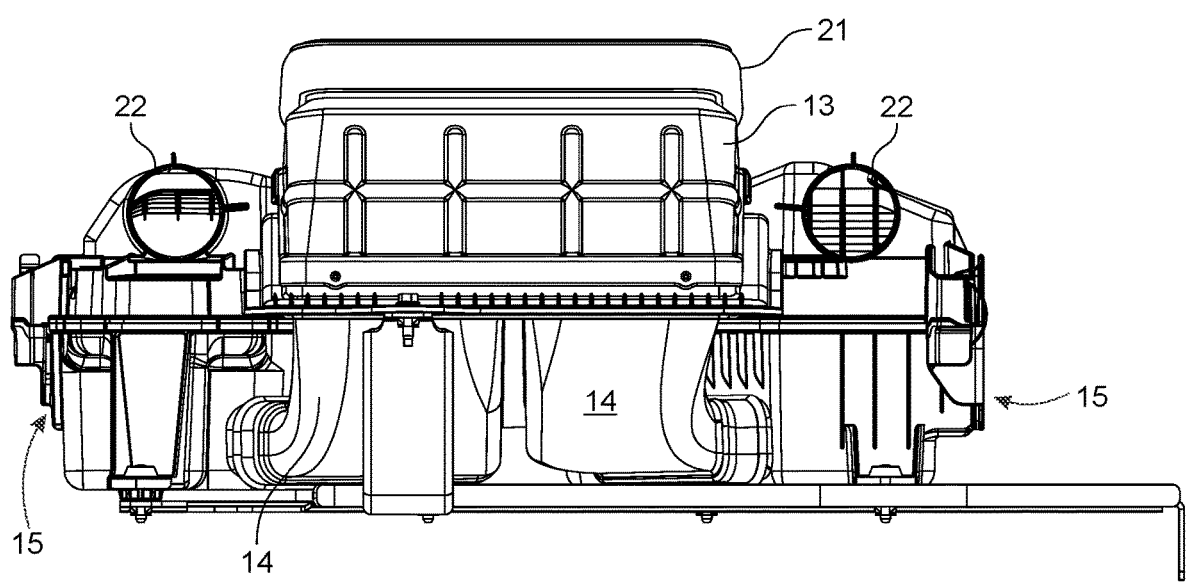
FIG. 4 illustrates a rear-facing view of the example air intake assembly of FIG. 1.

FIG. 4 illustrates a rear-facing view of the example air intake assembly of FIG. 1. This view illustrates that the pair of ducts 14 direct air into the bottom portion of their respective air boxes 15. Air filters 18 (not shown) can be oriented to bisect air boxes 15 in a horizontal fashion to create upper and lower chambers within each airbox 15. Accordingly, air entering the lower chambers of air boxes 15 is forced upward through the respective air filters 18 and the filtered air in the upper chambers passes through the respective duct 22 where it can be channeled to the respective fuel-cell.

Embodiments of this design can be used to provide a greatly simplified air intake assembly for vehicles that utilize multiple fuel cells. Rather than having separate systems for each fuel-cell in the vehicle, embodiments of the present assembly may be configured to reduce complexity and save valuable space under the hood. This is in contrast to conventional systems that require a complex design for each fuel cell air filter/cleaner assembly to have its own air source/plenum.

An air intake assembly for a multi-fuel-cell vehicle in various embodiments may include: an intake plenum, which may include an intake opening and an outlet opening; a flexible seal disposed around the intake opening of the intake plenum; a plurality of air boxes; a plurality of air ducts each disposed with an intake coupled to receive air from the intake plenum and to channel the air into its respective air box; and wherein the quantity of air boxes and air ducts corresponds to a quantity of fuel cells in the multi-fuel cell vehicle.

A multi-fuel-cell vehicle may include: an air intake assembly for a multi-fuel-cell vehicle. The air intake assembly may include: an intake plenum comprising an intake opening and an outlet opening; a flexible seal disposed around the intake opening of the intake plenum; a plurality of air boxes; a plurality of air ducts each disposed with an intake coupled to receive air from the intake plenum and to channel the air into its respective air box; and wherein the quantity of air boxes and air ducts corresponds to a quantity of fuel cells in the multi-fuel cell vehicle.

The intake assembly may further include a plurality of output ducts disposed to couple air from their respective air boxes to their respective fuel cells. The intake assembly may further include a plurality of air filters disposed within their respective air boxes. The air filters may include cartridge air filters. The plenum may include a rigid material and the flexible seal is sufficiently flexible to mate with an OEM plenum of the multi-fuel-cell vehicle.

A method of manufacturing an air intake assembly for a multi-fuel-cell vehicle may include: providing a single intake plenum comprising an intake opening and an outlet opening; mounting a flexible seal around the intake opening of the single intake plenum; providing a plurality of air boxes; mounting a plurality of air ducts in a position with an intake coupled to receive air from the intake plenum and to channel the air into its respective air box; and wherein the quantity of air boxes and air ducts corresponds to a quantity of fuel cells in the multi-fuel cell vehicle.

The method may further include providing a plurality of output ducts disposed to couple air from their respective air boxes to their respective fuel cells.

The method may further include mounting a plurality of air filters within their respective air boxes.

The intake plenum may further include a rigid material and the flexible seal is sufficiently flexible to mate with an OEM plenum of the multi-fuel-cell vehicle.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An air intake assembly for a multi-fuel-cell vehicle, the air intake assembly comprising:
    an intake plenum comprising an intake opening and an outlet opening;
    a flexible seal disposed around the intake opening of the intake plenum;
    a plurality of air boxes;
    a plurality of air ducts each disposed with an intake coupled to receive air from the intake plenum and to channel the air into its respective air box; and
    wherein the quantity of air boxes and air ducts corresponds to a quantity of fuel cells in the multi-fuel cell vehicle.

2. The intake assembly of claim 1, further comprising a plurality of output ducts disposed to couple air from their respective air boxes to their respective fuel cells.

3. The intake assembly of claim 1, further comprising a plurality of air filters disposed within their respective air boxes.

4. The intake assembly of claim 3, wherein the air filters comprise cartridge air filters.

5. The intake assembly of claim 1, wherein the intake plenum comprises a rigid material and the flexible seal is sufficiently flexible to mate with an OEM plenum of the multi-fuel-cell vehicle.

6. A multi-fuel-cell vehicle, comprising:
    an air intake assembly for a multi-fuel-cell vehicle, the air intake assembly comprising:
        an intake plenum comprising an intake opening and an outlet opening;
        a flexible seal disposed around the intake opening of the intake plenum;
        a plurality of air boxes;
        a plurality of air ducts each disposed with an intake coupled to receive air from the intake plenum and to channel the air into its respective air box; and
        wherein the quantity of air boxes and air ducts corresponds to a quantity of fuel cells in the multi-fuel cell vehicle.

7. The multi-fuel-cell vehicle of claim 1, wherein the air intake assembly further comprises a plurality of output ducts disposed to couple air from their respective air boxes to their respective fuel cells.

8. The multi-fuel-cell vehicle of claim 1, further comprises a plurality of air filters disposed within their respective air boxes.

9. The multi-fuel-cell vehicle of claim 3, wherein the air filters comprise cartridge air filters.

10. The multi-fuel-cell vehicle of claim 1, wherein the intake plenum comprises a rigid material and the flexible seal is sufficiently flexible to mate with an OEM plenum of the multi-fuel-cell vehicle.

11. A method of manufacturing an air intake assembly for a multi-fuel-cell vehicle, the method comprising:
    providing a single intake plenum comprising an intake opening and an outlet opening;
    mounting a flexible seal around the intake opening of the single intake plenum;
    providing a plurality of air boxes;
    mounting a plurality of air ducts in a position with an intake coupled to receive air from the intake plenum and to channel the air into its respective air box; and
    wherein the quantity of air boxes and air ducts corresponds to a quantity of fuel cells in the multi-fuel cell vehicle.

12. The method of claim 11, wherein the method further comprises providing a plurality of output ducts disposed to couple air from their respective air boxes to their respective fuel cells.

13. The method of claim 11, wherein the method further comprises mounting a plurality of air filters within their respective air boxes.

14. The method of claim 11, wherein the intake plenum comprises a rigid material and the flexible seal is sufficiently flexible to mate with an OEM plenum of the multi-fuel-cell vehicle.

* * * * *